3,370,064
CERTAIN 4-(CHLOROPHENYLHYDRAZONO)-2-ISOXAZOLIN-5-ONES
Michael Joseph Augustine Geoghegan, John Angus William Turner, and Peter Frank Hilary Freeman, Bracknell, England, and Lindsay Anderson Summers, Newcastle, New South Wales, Australia, assignors to Imperial Chemical Industries Limited, London, England, a corporation of Great Britain
No Drawing. Continuation-in-part of application Ser. No. 147,741, Oct. 26, 1961. This application Feb. 16, 1965, Ser. No. 433,162
Claims priority, application Great Britain, Nov. 2, 1960, 37,645/60; July 31, 1961, 27,676/61
7 Claims. (Cl. 260—307)

This application is a continuation-in-part of Ser. No. 147,741 filed Oct 26, 1961, and now abandoned.

This invention relates to the use as fungicides of 2-isoxazolin-5-ones, to new 2-isoxazolin-5-ones and to processes for their preparation.

The invention includes fungicidal compositions comprising as active ingredient a 2-isoxazolin-5-one of the formula:

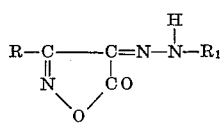

where R is a carboxymethyl or carboxyethyl radical, or an alkyl radical of 1–6 carbon atoms (especially 1–4 carbon atoms), such as methyl, ethyl, propyl and butyl, optionally having a substituent hydroxy or cyano group or a halogen atom and $R_1$ is a substituted or unsubstituted phenyl or naphthyl radical, and a carrier for the active ingredient, said carrier comprising a solid inert diluent, or a liquid diluent containing a surface active agent.

Where the group $R_1$ is a substituted phenyl or naphthyl radical the substituents can be, for example, one or more of the following: alkyl and alkoxy radicals of from 1 to 12 and especially from 1 to 4 carbon atoms, cycloalkyl, aryl (or substituted aryl), arylazo (or substituted arylazo), aryloxy, halogen, carboxy, alkoxycarbonyl, carboamino, cyano, nitro, hydroxyl, trifluoromethyl, amino, N-alkylamino, N,N-dialkylamino, sulphonic acid, sulphonamido, aminosulphonyl or thiocyanate radicals.

It has been found that compounds where the group $R_1$ is a chloro-substituted phenyl radical or a lower alkyl-substituted phenyl radical possess useful fungicidal properties as is shown in the examples. Examples of di-substituted phenyl radicals are those in which the substituents are two alkyl or two alkoxy radicals, two atoms of any of the halogens, alkyl and alkoxy, alkyl and nitro, alkoxy and nitro, alkyl and halogen or alkoxy and halogen.

The compound used as active ingredient can if desired be in the form of one of its salts, for example its sodium or potassium salt.

Some of the compounds of the invention have been found to be very effective when applied as foliage fungicides, some when applied as seed-dressings and some as soil fungicides; and the exact form of the fungicidal composition depends to a large extent upon the use to which the composition is to be put and the pathogen which it is wished to control. For example, the compositions can be powders, solutions, dispersions or pastes. Where they are powders they can be ones in which the active ingredient is in admixture with a powder diluent. Where the composition is liquid it can be one in which the active ingredient is dissolved or suspended in a suitable liquid, for example water or a suitably non-phytotoxic liquid. The ingredients used with the active ingredient in any of the fungicidal compositions of this invention can be substances known to the art as being suitable in the formulation of fungicidal compositions, for example surface active substances such as wetting and dispersing agents, binders, stickers, corrosion inhibitors and stabilising agents.

Fungicidal compositions of the invention which have been found to be useful as liquid seed dressings are solutions of the sodium salt of 3-methyl-4-phenylhydrazono-2-isoxazolin-5-one in β-ethoxyethanol, diacetonyl alcohol or ethylene glycol, and in particular solutions in which the sodium salt is present in a proportion of about 25% w./v.

The invention also consists in the new 2-isoxazolin-5-ones of the general formula:

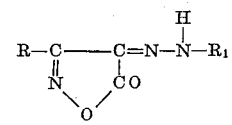

where R is an alkyl radical of 2–6 (especially 2–4) carbon atoms, a carboxyalkyl or alkoxycarbonylalkyl radical of not more than 4 carbon atoms, and $R_1$ is a substituted or unsubstituted phenyl or naphthyl radical; or where R is an alkyl radical of 1–6 (especially 1–4) carbon atoms or a carboxyalkyl or alkoxycarbonylalkyl radical of not more than 4 carbon atoms and $R_1$ is a chloro-substituted phenyl radical; and their salts.

The 2-isoxazolin-5-ones useful as active ingredients in the fungicidal compositions of this invention can be obtained, for example, by a process in which there is reacted together a keto-ester of the formula:

where R is an alkyl radical of 1–6 (especially 1–4) carbon atoms or a carboxyalkyl or an alkoxycarbonylalkyl radical of not more than 4 carbon atoms and $R_3$ is an alkyl radical of 1–4 carbon atoms, the appropriate substituted or unsubstituted phenyl or naphthyl diazonium salt and hydroxylamine or a salt of hydroxylamine. The process is conveniently performed with the reactants dissolved or dispersed in water or in a mixture of water and ethanol. The diazonium salt can be conveniently produced in situ by the reaction of the appropriate amine and nitrous acid as is illustrated in the examples of this specification.

A second process for the preparation of the 2-isoxazolin-5-ones is one in which an azo compound of the formula:

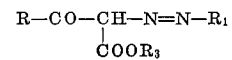

where R and $R_3$ have the meanings given to them in connection with the first process described above and $R_1$ is a substituted or unsubstituted phenyl or naphthyl radical, is reacted with hydroxylamine or a salt thereof. This process is conveniently carried out in mildly alkaline conditions, for example with the reactants dissolved or dispersed in water or in a mixture of water and ethanol and in the presence of caustic alkali or sodium acetate, or in pyridine. Since reaction at room temperature is generally slow the process is preferably carried out at an elevated temperature, for example at a temperature in the range 60–115° C. The azo compound used in this second process can conveniently be obtained in situ by the reaction of a keto-ester of formula:

and the appropriate diazonium salt.

In the preparation of compounds of this invention where the group R is a methyl group satisfactory results have been obtained using diketene instead of the keto-ester.

The invention also consists in a method of combating plant pathogens, in which the foliage of a plant susceptible to such pathogens, seed from which the plant can be grown or soil in which the plant is to be grown, is treated with a compound or fungicidal composition as hereindescribed.

The invention is illustrated by the following examples:

Example 1

Ethyl acetoacetate (6.6 g.), hydroxylamine hydrochloride (3.5 g.), m-toluidine (5.4 g.) and concentrated aqueous hydrochloric acid (10 ml.) were mixed with water (25 ml.) and the mixture was cooled to about 5° C. A cold aqueous solution of sodium nitrite (4.0 g.) in water (10 ml.) was added slowly to the mixture with stirring, care being taken that the temperature did not rise above 10° C. The mixture was then stirred for 6 hours, the temperature being allowed during this time to rise slowly to about 20° C., and filtered. The solid residue which was obtained on the filter was washed with water and crystallised from a mixture of ethanol and benzene. The product thus obtained was *3 - methyl - 4 - (3'-methylphenylhydrazono)-2-isoxazolin-5-one,* as yellow crystals, M.P. 172° C.

Example 2

3-chloro-4-methylaniline (7.1 g.) was suspended in water (60 ml.) and the mixture acidified with concentrated aqueous hydrochloric acid (18 ml.). After cooling to 5° C. the mixture was diazotised with a solution of sodium nitrite (4.0 g.) in water (15 ml.). The solution so obtained was then added slowly with stirring to a cold (5° C.) mixture of ethyl acetoacetate (6.6 g.) in ethanol (170 ml.) and water (45 ml.) to which had been added anhydrous sodium acetate (24 g.). The mixture was allowed to stand at about 20° C. for 15 hours, filtered and the solid residue obtained on the filter washed with water. The residue was dissolved in boiling ethanol (100 ml.) and to this solution there was added slowly a hot solution of hydroxylamine hydrochloride (3.5 g.) in water 100 ml.) to which had been added anhydrous sodium acetate (8.2 g.). The mixture so obtained was heated under reflux for 15 minutes, allowed to stand for 15 hours at about 20° C. and filtered. The solid residue which was obtained on the filter was washed with water and crystallised from ethanol. The product thus obtained was *3-methyl-4-(3'-chloro - 4' - methylphenylhydrazono-2-isoxazolin-5-one* as yellow crystals, M.P. 192° C.

Examples 3–33

A number of other 2-isoxazolin-5-ones have been prepared by the general methods described above in Examples 1 and 2, but using the appropriate amine in each instance instead of m-toluidine and 3-chloro-4-methylaniline used respectively in those examples. These other 2-isoxazolin-5-ones are set out in the table below as Examples 3–33. The products of Examples 3–15 were obtained by the process of Example 1 while those of Examples 16–33 were obtained by the process of Example 2. The products of Examples 3–33 are believed to all have the general formula:

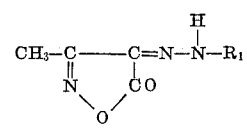

where $R_1$ is a substituted benzene ring and the products are identified in each example by the meaning given to $R_1$ in the column having that heading. For the sake of convenience the double bonds have been omitted from all the benzene rings shown. The melting point shown against each product is that obtained using a sample of the product which had been purified by recrystallisation.

TABLE I

| Example No. | Product | | |
|---|---|---|---|
| | $R_1$ | M.P. (° C.) | Appearance |
| 3 |  (OMe) | 193 | Yellow crystals. |
| 4 |  —OMe | 208 | Orange crystals. |
| 5 |  (Me, Me) | 150 | Do. |
| 6 |  Cl | 192 | Yellow crystals. |
| 7 |  (Cl) | 168 | Orange crystals. |
| 8 |  (Me, Me) | 142 | Do. |
| 9 |  (EtO) | 140 | Do. |
| 10 |  —OEt | 150 | Do. |
| 11 |  (O₂N) | 214 | Yellow crystals. |

TABLE I—Continued

| Example No. | R₁ (substituents on phenyl) | M.P. (°C.) | Appearance |
|---|---|---|---|
| 12 | 3,4-Me, Me | 199 | Do. |
| 13 | 2,3-Me, Me | 136 | Orange crystals. |
| 14 | 2-NO₂ | 205 | Brown crystals. |
| 15 | 2,4,6-Me, Me, Me | 128 | Orange crystals. |
| 16 | 2-Me, 4-Cl | 148 | Do. |
| 17 | 3,5-Me, Me | 171 | Do. |
| 18 | 2,4-Cl, Cl | 193 | Yellow crystals. |
| 19 | 2-Br | 163 | Brown crystals. |
| 20 | 2-Me, 3-Cl | 194 | Yellow crystals. |
| 21 | 2-Cl, 5-Me | 148 | Do. |
| 22 | 2,3-Cl, Cl | 170 | Do. |
| 23 | 2,4-Cl, Cl | 182 | Do. |
| 24 | 2-Me, 4-Cl | 168 | Do. |
| 25 | 2-Br | 145 | Do. |
| 26 | 4-F | 165 | Orange crystals. |
| 27 | 2-F | 200 | Yellow crystals. |

TABLE I—Continued

| Example No. | Product R₁ | M.P. (°C.) | Appearance |
|---|---|---|---|
| 28 | –⟨phenyl⟩ with Cl (top), Cl (right) | 160 | Do. |
| 29 | –⟨phenyl⟩ with Br (top), F (right) | 182 | Red crystals. |
| 30 | –⟨phenyl⟩ with $CF_3$ (top) | 198 | Orange crystals. |
| 31 | –⟨phenyl⟩ with COOEt (top) | 96 | Yellow crystals. |
| 32 | –⟨phenyl⟩ with EtOOC (top) | 120 | Do. |
| 33 | –⟨phenyl⟩–N=N–⟨phenyl⟩ | 208 | Brick-red crystals. |

Example 34

Ethylacetoacetate (6.6 g.), hydroxylamine hydrochloride (3.5 g.), m-chloroaniline (6.4 g.) and concentrated aqueous hydrochloric acid (10 ml.) were added to ethanol (10 ml.) and the mixture cooled to about 5° C. A cold aqueous solution of sodium nitrite (4.0 g.) in water (10 ml.) was added slowly to the mixture with stirring so that the temperature did not exceed 10° C. The mixture was then stirred for a further 6 hours, the temperature being allowed during this time to rise slowly to about 20° C., and filtered. The solid residue which was obtained on the filter was washed with water and crystallised from a mixture of ethanol and benzene. The product thus obtained was *3 - methyl-4-(3'-chlorophenylhydrazono)-2-isoxazolin-5-one* as brown crystals, M.P. 162° C.

Example 35 p-Ethylaniline (6.1 g.) was suspended in water (60 ml.) and the mixture acidified with concentrated aqueous hydrochloric acid (18 ml.). After cooling to 5° C. the mixture was diazotised with a solution of sodium nitrite (4.0 g.) in water (15 ml.). The resulting solution was added slowly with stirring to a cold (5° C.) mixture of ethyl acetoacetate (6.6 g.) in ethanol (170 ml.) and water (45 ml.) to which had been added anhydrous sodium acetate (24 g.). The mixture was allowed to stand at about 20° C. for 15 hours and the heavy oil which was obtained was separated from the aqueous layer and washed with water. The washed oil was dissolved in boiling ethanol (100 ml.) and to this solution there was added slowly a hot solution of hydroxylamine hydrochloride (3.5 g.) in water (100 ml.) to which had been added anhydrous sodium acetate (8.2 g.). The mixture so obtained was heated under reflux for 15 minutes, allowed to stand for 15 hours at about 20° C. and filtered. The solid residue which was obtained on the filter was washed with water and crystallised from ethanol. The product thus obtained was *3-methyl-4-(4'-ethylphenylhydrazono) - 2 - isoxazolin-5-one* as yellow crystals, M.P. 154° C.

Example 36

The process described in Example 35 was repeated except that the p-ethylaniline (6.1 g.) was replaced by o-ethylaniline (6.1 g.). The product when crystallised from ethanol was *3-methyl-4-(2'-ethylphenylhydrazono)-2-isoxazolin-5-one* as orange crystals, M.P. 122° C.

Examples 37, 38 and 39 describe the preparation of various salts of 2-isoxazolin-5-ones.

Example 37

3 - methyl-4-(3'-methylphenylhydrazono)-2-isoxazolin-5-one (3 g. of the compound obtained as the product of Example 1 above) was suspended in 10% aqueous sodium hydroxide solution (30 ml.) and ethanol (30 ml.) was added. The mixture was heated at about 80° C. for 2 minutes and the resultant solution was filtered. On cooling the resulting filtrate, a crystalline solid precipitated which was removed by filtration and was washed with ether. The product thus obtained was the *sesquihydrate of the sodium salt of 3-methyl-4-(3'-methylphenylhydrazono)-2-isoxazolin-5-one* as yellow needles which slowly decomposed on heating but were not completely fused at 300° C.

Example 38

The process described in Example 37 was repeated except that the 3-methyl-4-(3'-methylphenylhydrazono)-2-isoxazolin-5-one (3 g.) was replaced by 3-methyl-4-(4'-chlorophenylhydrazono)-2-isoxazolin-5-one (3 g. of the compound obtained as product of Example 6 above). The product was the *trihydrate of the sodium salt of 3-methyl-4-(4'-chlorophenylhydrazono)-2-isoxazolin-5-one* as yellow crystals, M.P. 170° C. with decomposition.

Example 39

The process described in Example 37 was repeated except that the 3-methyl-4-(3'-methylphenylhydrazono)-2-isoxazolin-5-one (3 g.) was replaced by 3-methyl-4-(4'-chlorophenylhydrazono)-2-isoxazolin-5-one (3 g. of the compound obtained as product of Example 6 above) and the 10% aqueous sodium hydroxide (30 ml.) by 10% aqueous potassium hydroxide (30 ml.). The product was the *sesquihydrate of the potassium salt of 3-methyl-4-(4'-chlorophenylhydrazono)-2-isoxazolin-5-one* as yellow crystals which decomposed at 170–180° C.

Example 40

This example describes the preparation of 3-methyl-4-(2':4':5'-trichlorophenylhydrazono) - 2 - isoxazolin-5-one by a process which is a modification of the general process described in example 2 above. The modification consists essentially of the use of pyridine, in place of ethanol, in the process's third stage where the product of the diazonium salt and the keto-ester is reacted with hydroxylamine hydrochloride.

The wet, crude intermediate (23 g.) obtained by reacting ethyl aceto-acetate (6.5 g.) with 2:4:5-trichlorophenyl-diazonium chloride by the general method of Example 2 was mixed with hydroxylamine hydrochloride (3.5 g.) and pyridine (75 ml.) and the mixture was refluxed for 1 hour. The product obtained was then poured into iced water containing hydrochloric acid and the solid which precipitated was removed by filtration and recrystallised from ethanol yielding *3-methyl-4-(2':4':5-trichlorophenylhydrazono)-2-isoxazolin-5-one* as a reddish-brown solid, M.P. 151° C.

*Examples 41–78*

A number of other 2-isoxazolin-5-ones have been prepared by the general method described in Examples 1, 2 or 40 above, but using various keto-esters and the appropriate amine in each instance. These 2-isoxazolin-5-ones are set out in Table II below as Examples 41–78.

The products of Examples 41–78 were obtained by processes involving a keto-ester of the formula:

$$R-CO-CH_2-COOEt$$

and a diazonium chloride of formula: $Cl-N=N-R_1$ and are believed to all have a structure corresponding to the general formula:

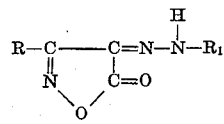

where R is an alkyl or alkoxycarbonylalkyl radical and $R_1$ is a substituted benzene ring.

In Table II the product of each example is identified by reference to the nature of the groups R and $R_1$, and for the sake of convenience the double bonds have been omitted from all the benzene rings depicted.

With the exceptions of Examples 52, 67, 68, 72, 73, 75 and 76, the compounds of all the examples in Table II were obtained using the general process describing in Example 2 above, but using the appropriate keto-ester and amine in each instance. With regard to the exceptions, the compounds of Examples 67 and 68 were obtained by the general process of Example 1 above; and the compounds of Examples 52, 72, 73, 75 and 76 by the general process of Example 40, using the appropriate keto-ester and amine in each instance.

TABLE II

| Example No. | Product R | Product $R_1$ | M.P. (° C.) |
|---|---|---|---|
| 41 | $CH_3$ | –⟨⟩ (nC₄H₉ below ring) | 48 |
| 42 | $CH_3$ | –⟨⟩–$nC_4H_9$ | 92 |
| 43 | $CH_3$ | –⟨⟩–$nC_{12}H_{25}$ | 91 |
| 44 | $CH_3$ | –⟨⟩–⟨⟩ | 202 |
| 45 | $CH_3$ | –⟨⟩ ($OC_2H_5$ below) | 162 |
| 46 | $CH_3$ | –⟨⟩–$COOC_2H_5$ | 204 |
| 47 | $CH_3$ | –⟨⟩–OH | 227 |
| 48 | $CH_3$ | –⟨⟩–$N(CH_3)_2$ | 170 |
| 49 | $CH_3$ | –⟨⟩–$SO_2NH_2$ | 226 |
| 50 | $CH_3$ | –⟨⟩–Br | 194 |
| 51 | $CH_3$ | –⟨⟩ (I below) | 199 |
| 52 | $CH_3$ | –⟨⟩–SCN | 174 |
| 53 | $CH_3$ | –⟨⟩ ($C_2H_5$ above, $C_2H_5$ below) | 60 |

TABLE II—Continued

| Example No. | R | R₁ | M.P. (° C.) |
|---|---|---|---|
| 54 | $CH_3$ | phenyl with $OC_2H_5$ (top) and $OC_2H_5$ (bottom) | 151 |
| 55 | $CH_3$ | phenyl with $OC_2H_5$ (top) and $OC_2H_5$ (bottom) | 176 |
| 56 | $CH_3$ | phenyl with $OC_3H_7(i)$ (top) and $OC_3H_7(i)$ (bottom) | 124 |
| 57 | $CH_3$ | phenyl with $OCH_3$ (top) and $OCH_3$ (bottom) | 187 |
| 58 | $CH_3$ | phenyl with $OCH_3$ (top) and $CH_3$ (bottom) | 146 |
| 59 | $CH_3$ | phenyl with $OC_2H_5$ (top) and $CH_3$ (bottom) | 151 |
| 60 | $CH_3$ | two phenyls linked by N=N, each with $CH_3$ | 127 |
| 61 | $CH_3$ | phenyl with $NO_2$ (para) and $CH_3$ (ortho) | 190 |
| 62 | $CH_3$ | phenyl with $CH_3$ (para) and $NO_2$ (meta) | 177 |
| 63 | $CH_3$ | phenyl with $NO_2$ (para) and $CH_3$ (meta) | 175 |
| 64 | $CH_3$ | phenyl with $CH_3$ (para) and $NO_2$ (meta) | 199 |
| 65 | $CH_3$ | phenyl with $NO_2$ and $OCH_3$ | 208 |
| 66 | $CH_3$ | phenyl with $OCH_3$ (para) and $NO_2$ (meta) | 184 |
| 67 | $C_2H_5$ | phenyl | 118 |
| 68 | $C_2H_5$ | phenyl with $CH_3$ | 134 |

TABLE II—Continued

| Example No. | Product R | R₁ | M.P. (° C.) |
|---|---|---|---|
| 69 | $C_2H_5$ | phenyl-CH₃ | 135 |
| 70 | $C_2H_5$ | phenyl-$OC_2H_5$ | 145 |
| 71 | $C_2H_5$ | phenyl-Cl | 160 |
| 72 | $C_2H_5$ | phenyl-Cl,Cl | 150 |
| 73 | $nC_4H_9$ | phenyl | 83 |
| 74 | $C_2H_5$—OOC—$CH_2$ | phenyl | 126 |
| 75 | $C_2H_5$—OOC—$CH_2$ | phenyl-$CH_3$ | 115 |
| 76 | $C_2H_5$—OOC—$CH_2$ | phenyl-$CH_3$ | 113 |
| 77 | $C_2H_5$—OOC—$CH_2$ | phenyl-$OC_2H_5$ | 127 |
| 78 | $C_2H_5$—OOC—$CH_2$ | phenyl-Cl | 220 |

Examples 79–88

Table III below includes as Examples 79–88 a number of further 2-isoxazolin-5-ones which have been formulated as fungicidal compositions. The various compounds are identified in Table III, as in Tables I and II, by reference to the nature of the groups R and R₁. The double bonds have, for convenience, been omitted from all the structures depicted.

TABLE III

| Example No. | Product R | R₁ | M.P. (° C.) |
|---|---|---|---|
| 79 | $CH_3$ | phenyl | 190 |
| 80 | $CH_3$ | phenyl-$CH_3$ | 204 |
| 81 | $CH_3$ | phenyl-$CH_3$ | 160 |
| 82 | $CH_3$ | phenyl-$CH_3O$ | 178 |
| 83 | $CH_3$ | phenyl-HOOC | ¹ 228 |
| 84 | $CH_3$ | phenyl-$CH_3$,$CH_3$ | 126 |
| 85 | $CH_3$ | phenyl-$CH_3$,Cl | 148 |
| 86 | $CH_3$ | biphenyl | 208 |
| 87 | $CH_3$ | phenyl | 168 |
| 88 | $CH_3$ | phenyl-$NO_2$ | 176 |

¹ With decomposition.

Good results have been obtained using fungicidal compositions of this invention as seed dressings, and in Table IV below there is shown compounds which have been found to be active against a number of economically important fungus and bacterial diseases. Similarly, Table V shows compounds found to be active against various foliage fungus diseases. The active ingredients of the compositions tested have been referred to below, for simplicity, by the number of the examples in Tables I, II or III in which they appear.

TABLE IV.—SEED DRESSINGS

| Disease | Crop | Active Ingredient—the Product of Example Nos. |
| --- | --- | --- |
| Pythium ultimum | Peas | 5, 11, 16, 17, 79 and 81. |
| Fusarium culmorum | ....do | 6, 7, 10, 26 and 81. |
| Xanthomonas malvacearum | Cotton | 22. |
| Tilletia caries | Wheat | 6, 82 and 84. |

TABLE V.—FOLIAGE FUNGICIDES

| Disease | Crop | Active Ingredient—the Product of Example Nos. |
| --- | --- | --- |
| Piricularia oryzae | Rice | 6, 7, 20, 36 and 85. |
| Plasmopara viticola | Vines | 7. |
| Erysiphe cichoracearum | Cucumbers | 1, 7, 10, 81 and 84. |
| Venturia inaequalis | Apples | 7, 19 and 81. |
| Alternaria solani | Tomatoes | 34 and 79. |
| Erysiphe graminis | Oats | 4 and 7. |
| Botrytis fabae | Broad Beans | 19, 26, 39 and 79. |

The compounds of Examples 5, 6, 11, 16, 26, 81, 82 and 84 have been found to be active against the soil-borne disease *Rhizoctonia solani*.

The fungicidal 4-arylhydrazono compounds of the present application were first described as 4-arylazo compounds in Ser. No. 147,741. This is due to the fact that the compounds in question can exist in different tautomeric forms. However, in the solid state in which the products described herein are made, these products are more correctly identified with the arylhydrazono structure rather than the tautomeric arylazo structure attributed to these same compounds in Ser. No. 147,741. It is intended that the claims herein should cover not only the use of the 4-arylhydrazono compounds but the tautomers thereof as well.

What we claim is:

1. A 2-isoxazolin-5-one which in one tautomeric form has the general formula:

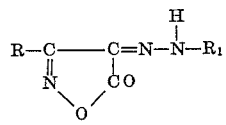

where R is selected from the group consisting of alkyl of 2–6 carbon atoms, carboxyalkyl and alkoxycarbonylalkyl radicals of up to 4 carbon atoms, and $R_1$ is chlorophenyl.

2. A 2-isoxazolin-5-one of the formula shown in claim 1 wherein R is alkyl containing from 1 to 4 carbon atoms and $R_1$ is chlorophenyl.

3. 3 - methyl - 4-(2'-chlorophenylhydrazono)-2-isoxazolin-5-one.

4. 3 - methyl - 4 - (3'-chlorophenylhydrazono)-2-isoxazolin-5-one.

5. 3 - methyl - 4 - (4'-chlorophenylhydrazono)-2-isoxazolin-5-one.

6. An alkali metal salt of a 2-isoxazolin-5-one as defined in claim 1.

7. A 2-isoxazolin-5-one which in one tautomeric free base form has the general formula:

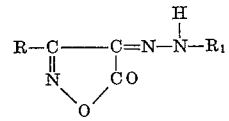

where R is selected from the group consisting of alkyl of 1–4 carbon atoms and carboxyalkyl and alkoxycarbonylalkyl wherein the alkyl contains 1–4 carbon atoms, and $R_1$ is chlorophenyl.

References Cited

UNITED STATES PATENTS

| | | | |
| --- | --- | --- | --- |
| 2,999,047 | 9/1961 | Model et al. | 167—33 |
| 3,090,721 | 5/1963 | Uhlenbroek et al. | 167—33 |
| 3,194,810 | 7/1965 | Formaini et al. | 260—307 |
| 3,202,673 | 8/1965 | Metivier et al. | 260—307 |

OTHER REFERENCES

Bulow et al., Berichte, Volume 44, (1911), pp. 238–50.

Burger, Medicinal Chemistry, Interscience, 1960, page 75.

Meyer, Compt. Rend., Volume 154 (1912), pp. 1511–14.

Schiff et al., Berichte, Volume 30 (1897), pp. 1159–66.

ALEX MAZEL, *Primary Examiner.*

HENRY R. JILES, *Examiner.*

RICHARD J. GALLAGHER, *Assistant Examiner.*